(12) United States Patent
Alateng et al.

(10) Patent No.: US 11,662,274 B2
(45) Date of Patent: May 30, 2023

(54) WHEEL ACCELERATION TORQUE SYSTEM AND TEST EQUIPMENT FOR AUTOMOBILE CHASSIS SIMULATION ROAD TEST

(71) Applicant: CITIC Dicastal Co., Ltd., Qinhuangdao (CN)

(72) Inventors: Alateng, Qinhuangdao (CN); Guoyuan Xiong, Qinhuangdao (CN); Yingying Song, Qinhuangdao (CN); Zuo Xu, Qinhuangdao (CN); Chenguang Wei, Qinhuangdao (CN); Hanqi Wu, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 23 days.

(21) Appl. No.: 17/368,189

(22) Filed: Jul. 6, 2021

(65) Prior Publication Data

US 2022/0316991 A1 Oct. 6, 2022

(30) Foreign Application Priority Data

Apr. 1, 2021 (CN) .......................... 202110353821.3

(51) Int. Cl.
*G01M 17/04* (2006.01)
(52) U.S. Cl.
CPC ................................ *G01M 17/045* (2013.01)

(58) Field of Classification Search
CPC ........................... G01M 17/04; G01M 17/045
See application file for complete search history.

(56) References Cited

U.S. PATENT DOCUMENTS

| | | | |
|---|---|---|---|
| 2007/0093347 A1* | 4/2007 | Janson | B60K 17/34 475/199 |
| 2017/0204961 A1* | 7/2017 | Sipila | B60K 5/02 |
| 2017/0305269 A1* | 10/2017 | DeCorte | F16H 57/025 |
| 2018/0010682 A1* | 1/2018 | Pritchard | F16D 13/644 |
| 2018/0354496 A1* | 12/2018 | Ruybal | B60K 6/387 |
| 2020/0001712 A1* | 1/2020 | Chirco | B60K 17/344 |

* cited by examiner

*Primary Examiner* — Eric S. McCall
(74) *Attorney, Agent, or Firm* — IPro, PLLC

(57) ABSTRACT

The present disclosure belongs to the technical field of automobile chassis suspension system tests, and provides a wheel acceleration torque system and test equipment for an automobile chassis simulation road test. The automatic connection and separation mechanism is connected with a transmission shaft of a wheel; the automatic connection and separation mechanism can apply acceleration torque of the torque shaft to the transmission shaft, and can separate the acceleration torque applied to the transmission shaft; and the wheel acceleration torque system and the test equipment can adapt to the requirement for applying the acceleration torque in a test of a test bench, simulate to apply the acceleration torque which the wheel bears in the actual road running process, ensure that a test state of a tested wheel and suspension system is close to a test state of a real automobile test field.

5 Claims, 3 Drawing Sheets

1

WHEEL ACCELERATION TORQUE SYSTEM AND TEST EQUIPMENT FOR AUTOMOBILE CHASSIS SIMULATION ROAD TEST

FIELD

The present application relates to the technical field of automobile chassis suspension system tests, in particular to a wheel acceleration torque system and test equipment for an automobile chassis simulation road test.

BACKGROUND

In the running process of an automobile, a wheel tire assembly can be acted on by a radial force, a lateral force and a longitudinal force. The radial force is an upward supporting force of a pavement for the wheel tire assembly, and is changed along with changes of a pavement behavior and a driving state. The lateral force mainly is a lateral friction force of the pavement for the wheel tire assembly, and is generated in a turning and laterally inclined road running state. The longitudinal force mainly is a friction force and a rolling resistance of the pavement for a tire in the automobile advancing direction, and is changed along with different acceleration states and braking states.

In order to verify reliability of a wheel, bench tests of bending fatigue, radial fatigue, biaxial fatigue, radial impact, 13-degree impact and the like need to be carried out in a test room, these bench tests can simulate working conditions under which the wheel bears the radial force, the lateral force and part of the longitudinal force in the actual road running process, but have no consideration of a working condition under which the wheel bears acceleration torque when the automobile is accelerated, resulting in the change of the longitudinal force which the wheel bears.

SUMMARY

The embodiments of the present application provide a wheel acceleration torque system and test equipment for an automobile chassis simulation road test. The wheel acceleration torque system and the test equipment can simulate to apply acceleration torque which a wheel bears in the actual road running process, more really simulate and reproduce an automobile running working condition, ensure that a test state of a tested wheel and suspension system is close to a test state of a real automobile test field, and make consistency between a test result of the automobile chassis simulation road test and a test result of the real automobile test field high.

In order to achieve the objective above, the present disclosure provides the following technical scheme:

In a first aspect, provided is a wheel acceleration torque system, including a torque shaft driving motor, a speed reducer, a torque shaft and an automatic connection and separation mechanism; an output shaft of the torque shaft driving motor is connected with the speed reducer; one end of the torque shaft is connected with an output end of the speed reducer, and the other end of the torque shaft is connected with the automatic connection and separation mechanism; the automatic connection and separation mechanism is connected with a transmission shaft of a wheel; and the automatic connection and separation mechanism can apply acceleration torque of the torque shaft to the transmission shaft, and can separate the acceleration torque applied to the transmission shaft.

In some embodiments, the automatic connection and separation mechanism includes a gear upper shaft, a gear lower shaft and a cylinder, one end of the gear upper shaft is a shaft end, while the other end is a gear end, and one end of the gear lower shaft is a shaft end, while the other end is a gear end; and the shaft end of the gear upper shaft is connected with the transmission shaft of the wheel, the gear end of the gear upper shaft and the gear end of the gear lower shaft can be meshed by a gear, the shaft end of the gear lower shaft is connected with a piston rod of the cylinder, and the cylinder can push the gear end of the gear lower shaft and the gear end of the gear upper shaft to be meshed by the gear and separated.

In some embodiments, a torque sensor is further arranged on the torque shaft.

In some embodiments, the torque shaft is a cross joint type universal coupling.

In a second aspect, an embodiment of the present application provides test equipment for an automobile chassis simulation road test, including the wheel acceleration torque system in any one of the above-mentioned embodiments, and further including a suspension assembly and a rotary drum assembly; the suspension assembly includes a suspension fixing frame and a quarter suspension for mounting a wheel, and the quarter suspension is fixed on the suspension fixing frame; and the suspension assembly can be in contact with the rotary drum assembly through the wheel, and the rotary drum assembly can drive the wheel to rotate.

In some embodiments, the rotary drum assembly includes a rotary drum, a rotary drum speed reducer and a rotary drum motor, an output shaft of the rotary drum motor is connected with a central shaft of the rotary drum through the rotary drum speed reducer, and the rotary drum motor can drive the rotary drum to rotate.

Compared to the prior art, the present disclosure has the beneficial effects:

The present disclosure provides the wheel acceleration torque system and the test equipment for the automobile chassis simulation road test. The wheel acceleration torque system includes the torque shaft driving motor, the speed reducer, the torque shaft and the automatic connection and separation mechanism; the automatic connection and separation mechanism is connected with a transmission shaft of a wheel; the automatic connection and separation mechanism can apply acceleration torque of the torque shaft to the transmission shaft, and can separate the acceleration torque applied to the transmission shaft; and the wheel acceleration torque system and the test equipment can adapt to the requirement for applying the acceleration torque in a test of a test bench, and can simulate to apply the acceleration torque which the wheel bears in the actual road running process, so that the test equipment for the automobile chassis simulation road test in the present disclosure more really simulates and reproduces an automobile running working condition in the automobile chassis simulation road test, ensures that a test state of a tested wheel and suspension system is close to a test state of a real automobile test field, and makes consistency between a test result of the automobile chassis simulation road test and a test result of the real automobile test field high.

1—suspension assembly; 2—rotary drum assembly; 3—torque shaft driving motor; 4—speed reducer; 5—torque sensor; 6—torque shaft; 7—automatic connection and separation mechanism; 101—tub and wheel assembly; 102—brake disc; 103—brake disc cover plate; 104—brake caliper; 105—tub bearing; 106—transmission shaft; 107—steering knuckle; 108—damper and spring; 109—upper front control arm; 110—upper rear control arm; 111—lower front control arm; 112—lower rear control arm; 113—toe-shaped control arm; 114—suspension fixing frame; 201—rotary drum; 202—rotary drum speed reducer; 203—rotary drum motor; 701—gear upper shaft; 702—gear lower shaft; and 703—cylinder.

DETAILED DESCRIPTION OF THE EMBODIMENTS

Embodiment 1

Figure 1:
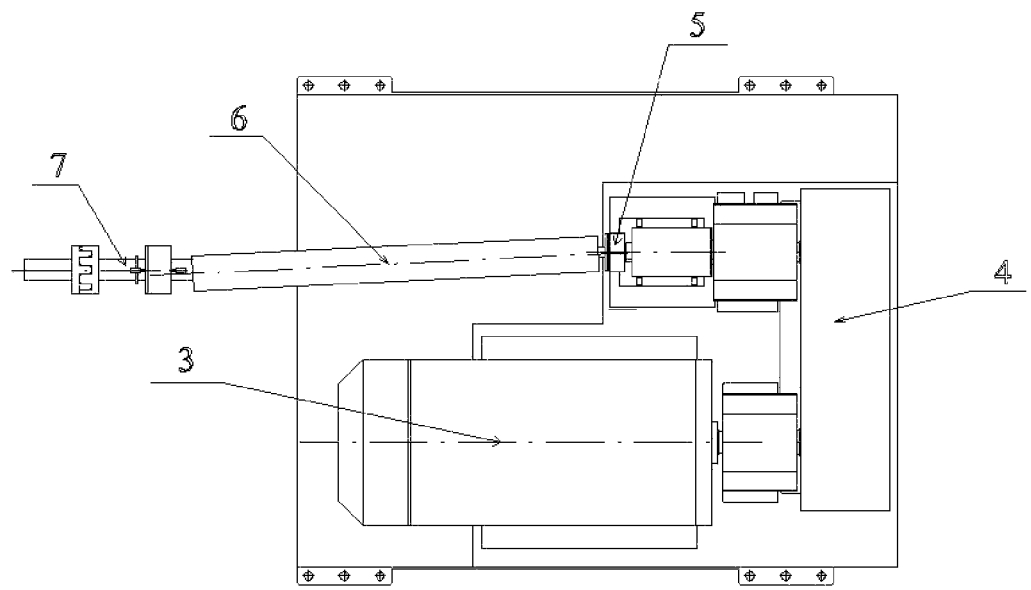
FIG. 1 is a structural schematic diagram of a wheel acceleration torque system for an automobile chassis simulation road test according to the present application.

Embodiment 1 provides a wheel acceleration torque system for an automobile chassis simulation road test, as shown in FIG. 1, including a torque shaft driving motor 3, a speed reducer 4, a torque sensor 5, a torque shaft 6 and an automatic connection and separation mechanism 7. An output shaft of the torque shaft driving motor 3 is connected with the speed reducer 4. One end of the torque shaft 6 is connected with an output end of the speed reducer 4, and the other end of the torque shaft 6 is connected with the automatic connection and separation mechanism 7. The torque sensor 6 is further arranged on the torque shaft 6. The automatic connection and separation mechanism 7 is connected with a transmission shaft of a wheel, and the automatic connection and separation mechanism 7 can apply acceleration torque of the torque shaft 6 to the transmission shaft, and can separate the acceleration torque applied to the transmission shaft.

Figure 2:
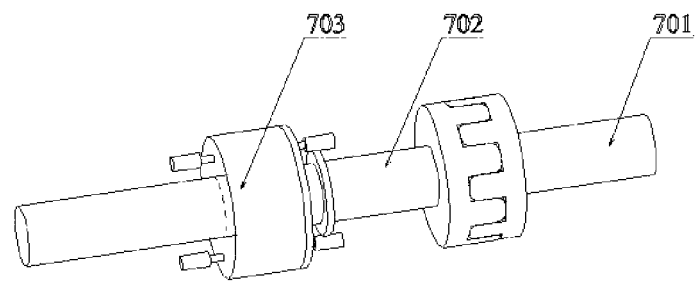
FIG. 2 is a structural schematic diagram of an automatic connection and separation mechanism of a wheel acceleration torque system for an automobile chassis simulation road test according to the present application.

As shown in FIG. 2, the automatic connection and separation mechanism 7 includes a gear upper shaft 701, a gear lower shaft 702 and a cylinder 703. One end of the gear upper shaft 701 is a shaft end, while the other end is a gear end, and one end of the gear lower shaft 702 is a shaft end, while the other end is a gear end. The shaft end of the gear upper shaft 701 is connected with the transmission shaft of the wheel, the gear end of the gear upper shaft 701 and the gear end of the gear lower shaft 702 can be meshed by a gear, the shaft end of the gear lower shaft 702 is connected with a piston rod of the cylinder 703, and the cylinder 703 can push the gear end of the gear lower shaft 702 and the gear end of the gear upper shaft 701 to be meshed by the gear and separated.

In Embodiment 1, the torque shaft driving motor 3 has rated power of 315 kW, and rated torque of 2,000 Nm. The torque shaft 6 is a cross joint type universal coupling, and has a rotation diameter of 180 mm, a maximum inclination angle of 15°, a length range of 1,450 mm to 2,020 mm and nominal fatigue torque of 11,200 Nm. The torque sensor 5 has a torque measurement range of 0 to 2,000 Nm and measurement accuracy of plus and minus 0.05 Nm. A speed reduction ratio of the speed reducer 4 is 1:1.

Embodiment 1 provides the wheel acceleration torque system and test equipment for an automobile chassis simulation road test. The wheel acceleration torque system includes the torque shaft driving motor, the speed reducer, the torque shaft and the automatic connection and separation mechanism; the automatic connection and separation mechanism is connected with the transmission shaft of the wheel; the automatic connection and separation mechanism can apply the acceleration torque of the torque shaft to the transmission shaft, and can separate the acceleration torque applied to the transmission shaft; and the wheel acceleration torque system and the test equipment can adapt to the requirement for applying the acceleration torque in a test of a test bench, and can simulate to apply the acceleration torque which the wheel bears in the actual road running process.

Embodiment 2

Embodiment 2 provides test equipment for an automobile chassis simulation road test, including the wheel acceleration torque system for the automobile chassis simulation road test in Embodiment 1, and further including a suspension assembly 1 and a rotary drum assembly 2.

Figure 3:
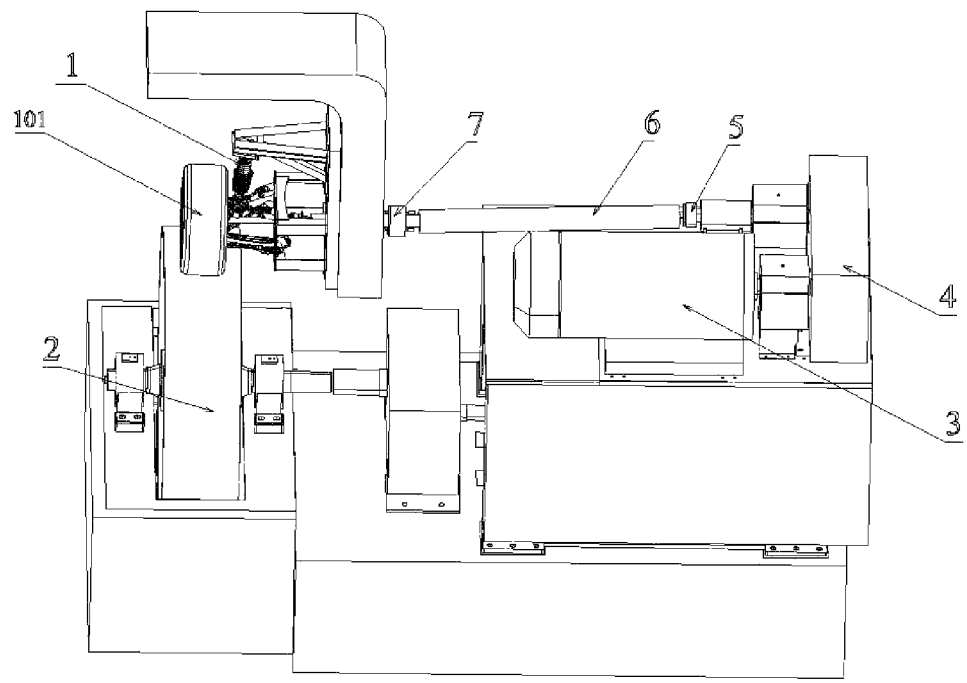
FIG. 3 is a structural schematic diagram of test equipment for an automobile chassis simulation road test according to the present application.

As shown in FIGS. 1-3, the test equipment includes the suspension assembly 1, the rotary drum assembly 2, the torque shaft driving motor 3, the speed reducer 4, the torque sensor 5, the torque shaft 6 and the automatic connection and separation mechanism 7; the suspension assembly 1 is fixed on a tester; and the rotary drum assembly 2 simulates a pavement to be arranged below the wheel and suspension assembly 1. The automatic connection and separation mechanism 7 includes the gear upper shaft 701, the gear lower shaft 702 and the cylinder 703. The automatic connection and separation mechanism 7 can apply the acceleration torque to the transmission shaft of the wheel according to loading requirements, and when the acceleration torque needs to be applied, the cylinder 703 of the automatic connection and separation mechanism 7 pushes the gear end of the gear lower shaft 702 and the gear end of the gear upper shaft 701 to be meshed by a gear, the torque shaft driving motor 3 outputs the acceleration torque, the acceleration torque is transferred to the suspension assembly 1 and the wheel fixed on the suspension assembly 1 by the speed reducer 4, the torque shaft 6 and the automatic connection and separation mechanism 7, and the torque sensor 5 is arranged on the torque shaft 6 and used for monitoring the applied acceleration torque value.

The suspension assembly 1 includes a suspension fixing frame 114 and a quarter suspension for mounting the wheel, and the quarter suspension is fixed on the suspension fixing frame 114; and the suspension assembly 1 can be loaded to the rotary drum assembly 2 through the wheel, i.e., the suspension assembly 1 can be in contact with the rotary drum assembly 2 through the wheel, and the rotary drum assembly 2 can drive the wheel to rotate. The wheel is a hub and tire assembly 101.

Figure 4:
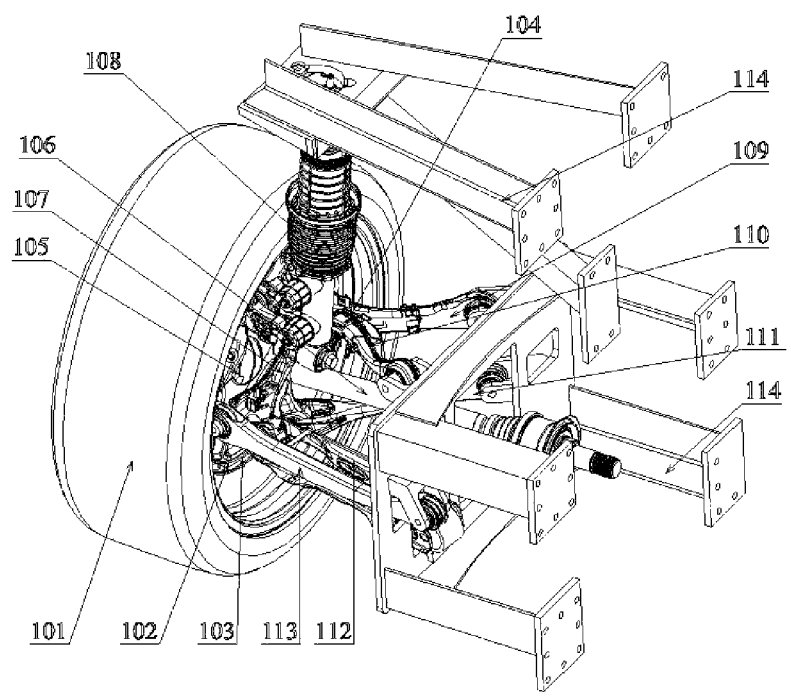
FIG. 4 is a structural schematic diagram of a suspension assembly of test equipment for an automobile chassis simulation road test according to the present application.
Figure 5:
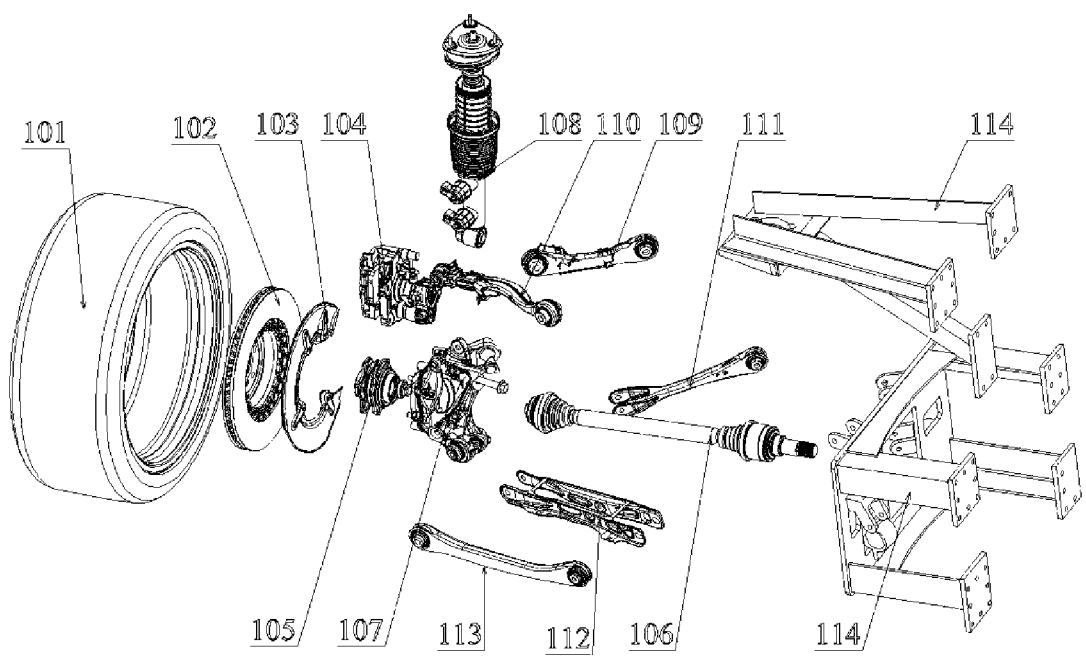
FIG. 5 is an exploded view (assembly schematic diagram) of a suspension assembly of test equipment for an automobile chassis simulation road test according to the present application.

As shown in FIGS. 4-5, the suspension assembly 1 includes the hub and tire assembly 101, a brake disc 102, a brake disc cover plate 103, a brake caliper 104, a tub bearing 105, a transmission shaft 106, a steering knuckle 107, a damper and spring 108, an upper front control arm 109, an upper rear control arm 110, a lower front control arm 111, a lower rear control arm 112, a toe-shaped control arm 113 and the suspension fixing frame 114. The hub and tire assembly 101, the brake disc 102, the brake disc cover plate 103, the brake caliper 104, the tub bearing 105, the transmission shaft 106, the steering knuckle 107, the damper and spring 108, the upper front control arm 109, the upper rear control arm 110, the lower front control arm 111, the lower rear control arm 112 and the toe-shaped control arm 113 are all original accessories of a BMW 5-series car. The suspension fixing frame 114 is designed according to real automobile assembly dimensions, a tire of the hub and tire assembly 101 is inflated to have the normal tire pressure, and the hub and tire assembly 101, the brake disc 102, the brake disc cover plate 103, the brake caliper 104, the tub bearing 105, the transmission shaft 106, the steering knuckle 107, the damper and spring 108, the upper front control arm 109, the upper rear control arm 110, the lower front control arm 111, the lower rear control arm 112 and the toe-shaped control arm 113 are mounted on the suspension fixing frame 114 according to an assembly relationship of a real automobile to form a wheel and suspension system 1.

Figure 6:
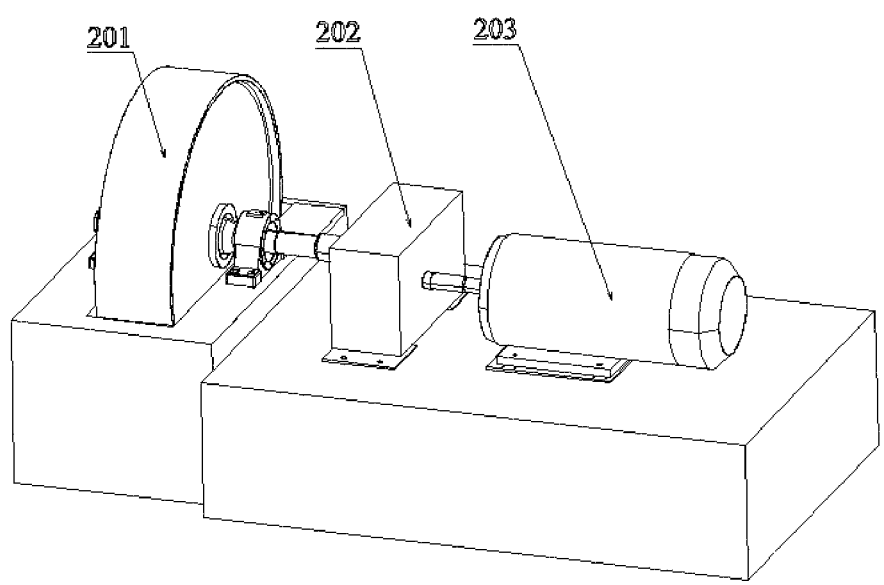
FIG. 6 is a schematic diagram of a rotary drum assembly of test equipment for an automobile chassis simulation road test according to the present application.

As shown in FIG. 6, the rotary drum assembly 2 includes a rotary drum 201, a rotary drum speed reducer 202 and a rotary drum motor 203, an output shaft of the rotary drum motor 203 is connected with a central shaft of the rotary drum through the rotary drum speed reducer 202, and the rotary drum motor 203 can drive the rotary drum 201 to rotate. The rotary drum motor 203 drives the rotary drum 201 to rotate through the rotary drum speed reducer 202, the rotary drum 201 is arranged below the hub and tire assembly 101, the rotary drum 201 is in contact with the hub and tire assembly 101, and the rotary drum 201 rotates to drive the hub and tire assembly 101 to rotate.

When the test equipment for the automobile chassis simulation road test in Embodiment 2 carries out the automobile chassis simulation road test, the test is carried out according to the following steps.

1. Test parameters are determined. The tester is an automobile chassis simulation road test tester, test objects are a left rear wheel of the BMW 5-series car and a suspension system thereof, an external inclination angle of the wheel is 1.594°, an automobile dead weight is 2,145 kg, a full-load automobile weight is 2,825 kg, and a rotation speed of the wheel is improved to 100 km/h.

2. The wheel and suspension system is assembled and mounted. A hub and the tire of the hub and tire assembly 101, the brake disc 102, the brake disc cover plate 103, the brake caliper 104, the tub bearing 105, the transmission shaft 106, the steering knuckle 107, the damper and spring 108, the upper front control arm 109, the upper rear control arm 110, the lower front control arm 111, the lower rear control arm 112 and the toe-shaped control arm 113 of the BMW 5-series car are purchased in the market. The wheel and the tire are assembled into the hub and tire assembly 101, the tire is inflated to have the tire pressure of 200 kPa, the hub and tire assembly 101 is mounted on the suspension fixing frame 114 according to an original assembly relationship to form the wheel and suspension system, the wheel and suspension system is mounted on the tester, and the distance between the hub and tire assembly 101 and the rotary drum 201 is guaranteed to be the same as the distance between a real automobile wheel and tire assembly and the ground.

3. The wheel is accelerated. The cylinder 703 of the automatic connection and separation mechanism 7 pushes the gear lower shaft 702 to extend out to be connected with the gear upper shaft 701; the rotary drum motor 203 and the torque shaft driving motor 3 are started up, the rotary drum motor 203 drives the rotary drum 201 to rotate through the rotary drum speed reducer 202, the rotary drum 201 rotates to drive the hub and tire assembly 101 to rotate, and the output torque of the rotary drum motor 203 is improved, so that rotation of the hub and tire assembly 101 is accelerated until the rotation speed of 100 km/h is reached; meanwhile, the output torque of the torque shaft driving motor 3 is transferred to the transmission shaft 106 of the wheel and suspension system 1 through the speed reducer 4, the torque shaft 6 and the automatic connection and separation mechanism 7; the torque sensor 5 monitors the output torque value of the torque shaft 6, when a set torque value is reached, the rotation speed of the hub and tire assembly 101 reaches a target rotation speed, the value of the torque which the transmission shaft 106 driving the hub and tire assembly 101 to rotate bears also reaches the target value, acceleration of the hub and tire assembly 101 is completed, and the cylinder 703 of the automatic connection and separation mechanism 7 pushes the gear lower shaft 702 to retract to be separated from the gear upper shaft 701; time consumed when the hub and tire assembly 101 is accelerated to 100 km/h from 0 is recorded; and acceleration is repeated five times.

Contrast Example 1: wheel real plane road test.

The same type of automobile with the car in Embodiment 2 is selected, acceleration of a wheel is carried out on a real plane road, the wheel is accelerated to 100 km/h as the operation in Embodiment 2, acceleration time is recorded, and acceleration is repeated five times.

In Embodiment 2 and Contrast Example 1, the same wheel and suspension system is selected to carry out the same acceleration, and thus, Embodiment 2 and Contrast Example 1 have comparability. Test data measured in Embodiment 2 and Contrast Example 1 are put into Table 1 for comparison, and a result table is as follows:

TABLE 1

Test Results of Embodiment 2 and Contrast Example 1

| Test Group | Time (s) consumed when wheel is accelerated to 100 km/h from 0 | |
| --- | --- | --- |
| | Embodiment 2 | Embodiment 1 |
| First Time | 9.0 | 8.8 |
| Second Time | 9.1 | 8.7 |
| Third Time | 9.3 | 9.0 |
| Fourth Time | 9.1 | 8.8 |
| Fifth Time | 9.2 | 8.9 |

It can be seen from the test results that when the same wheel and suspension system is adopted to carry out the same acceleration, consistency between an acceleration consumed time result measured by adopting the test equipment for the automobile chassis simulation road test according to the present application and an acceleration consumed time result measured when a real automobile runs on a real road is high, and the wheel acceleration torque system for the automobile chassis simulation road test can accurately accelerate the wheel.

In order to enable those of ordinary skill in the art to better understand technical solutions of the present application, the technical solutions in embodiments of the present application will be clearly and fully described in combination with the accompanying drawings.

What is claimed is:

1. A wheel acceleration torque system, comprising:
a torque shaft driving motor having an output shaft;
a speed reducer connected with the output shaft;
a torque shaft having one end connected with an output end of the speed reducer; and
an automatic connection and separation mechanism connected to the other end of the torque shaft and connected with a transmission shaft of a wheel,
wherein the automatic connection and separation mechanism is configured to apply acceleration torque of the torque shaft to the transmission shaft and to separate the acceleration torque applied to the transmission shaft, and
wherein the automatic connection and separation mechanism comprises:
a gear upper shaft having a shaft end and a gear end;
a gear lower shaft having a shaft end and a gear end; and
a cylinder,
wherein the shaft end of the gear upper shaft is connected with the transmission shaft of the wheel,
the gear end of the gear upper shaft and the gear end of the gear lower shaft are configured to be meshed by a gear,
the shaft end of the gear lower shaft is connected with a piston rod of the cylinder, and
the cylinder is configured to push the gear end of the gear lower shaft and the gear end of the gear upper shaft to be meshed by the gear and separated.

2. The wheel acceleration torque system according to claim 1, wherein a torque sensor is further arranged on the torque shaft.

3. The wheel acceleration torque system according to claim 1, wherein the torque shaft is a cross joint type universal coupling.

4. A test equipment for an automobile chassis simulation road test comprising:
the wheel acceleration torque system according to claim 1;
a suspension assembly having a suspension fixing frame and a quarter suspension for mounting the wheel, wherein the quarter suspension is fixed on the suspension fixing frame; and
a rotary drum assembly configured to drive the wheel to rotate,
wherein the suspension assembly is configured to be in contact with the rotary drum assembly through the wheel.

5. The test equipment for the automobile chassis simulation road test according to claim 4, wherein the rotary drum assembly comprises:
a rotary drum,
a rotary drum speed reducer and
a rotary drum motor having an output shaft connected with a central shaft of the rotary drum through the rotary drum speed reducer, wherein the rotary drum motor is configured to drive the rotary drum to rotate.

* * * * *